United States Patent [19]

Palladino et al.

[11] 3,976,621
[45] Aug. 24, 1976

[54] PHOTODEGRADABLE COPOLYMERS OF ETHYLENE AND VINYL ALCOHOL CONTAINING KETOETHER GROUPS

[75] Inventors: Nicola Palladino, Monterotondo; Marcello Mazzei, Milan; Paolo Bacchin, Rome; Walter Marconi, San Donato Milanese, all of Italy

[73] Assignee: Snam Progeth S.p.A., San Donato Milanese, Italy

[22] Filed: Oct. 24, 1974

[21] Appl. No.: 517,755

[30] Foreign Application Priority Data
Oct. 24, 1973   Italy .................................. 30483/73

[52] U.S. Cl. ........................... 260/66; 260/DIG. 43;
526/9; 526/13; 526/42; 526/54; 526/55;
526/914
[51] Int. Cl.² .......................................... C08L 29/02
[58] Field of Search ....... 260/DIG. 43, 87.3, 88.1 R,
260/88.1 PE, 91.3 VA, 66; 450/604;
204/159.18; 96/115 R

[56] References Cited
UNITED STATES PATENTS

| | | | |
|---|---|---|---|
| 2,474,095 | 6/1949 | Cornthwaite et al. ................. | 260/66 |
| 3,068,202 | 12/1962 | Burg ..................................... | 260/66 |
| 3,165,497 | 1/1965 | Tocker ........................... | 260/88.1 R |

FOREIGN PATENTS OR APPLICATIONS

| | | | |
|---|---|---|---|
| 489,343 | 7/1938 | United Kingdom .................. | 260/66 |

OTHER PUBLICATIONS

J. Org. Chem., vol. 72, pp. 5161–5163, Newman et al., (1950).

Journal of Applied Polymer Science, vol. 18, pp. 2085–2093, (1974), Cernia et al.

*Primary Examiner*—Eugene C. Rzucidlo
*Attorney, Agent, or Firm*—Ralph M. Watson

[57] ABSTRACT

A copolymer of ethylene and vinyl alcohol which contains ketoether groups and is photodegradable under the direct action of sunlight is prepared by reacting an ethylene-vinyl alcohol copolymer with alpha-diazoacetophenone in the presence of an organic solvent and a catalyst consisting of a Lewis acid.

4 Claims, No Drawings

PHOTODEGRADABLE COPOLYMERS OF ETHYLENE AND VINYL ALCOHOL CONTAINING KETOETHER GROUPS

The present invention relates to a process for rendering polymers degradable and also to the polymers obtained thereby.

More particularly the present invention relates to a process for thermoplastic materials degradable under the direct action of sun light.

The thermoplastic polymers are largely employed because of their resistance against atmospheric and microbiological agents.

In the packing industry they have entirely supplanted the cellulose base natural materials not only for reasons of economy but also for technical reasons.

However, while the cellulose base products are easily biodegradable, the plastics show a remarkable resistance against biodegradation with consequent harmful effects through the pollution of the natural environment.

In order to avoid such a drawback there have been proposed some solutions such as, for instance, the employment of polymers of intrinsically low stability or the introduction of photosensitive groups into the more commonly usable polymers. For instance for limited agricultural employments, there have been proposed the use of polybutene-1 and copolymers thereof, syndiotactic polybutadiene 1-2 and copolymers thereof.

In the case of plastic materials usable in packing, it has been proposed to use styrene-vinylketones, styrene-carbon monoxide or ethylene-carbon monoxide copolymers.

The subject of the present invention is a process for the preparation of polymers which are degradable under the action of the ultraviolet radiations of the sun spectrum.

Said polymers, which constitute a further subject of the present invention, contain alpha ketoether groups having the general formula

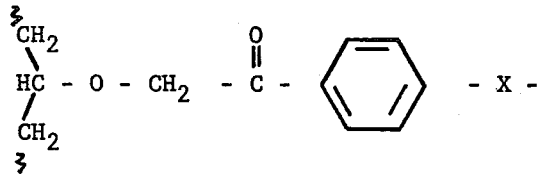

in which X is selected from H, COR, SO$_3$H, R, SCN, NO, halogens, CN, COOH, COOR, R, being an alkyl, aryl or cycloalkyl radical.

Such polymers are synthesized by reacting an ethylene-vinyl alcohol copolymer with alpha-diazoacetophenone or a para-substituted derivative thereof according to the following scheme

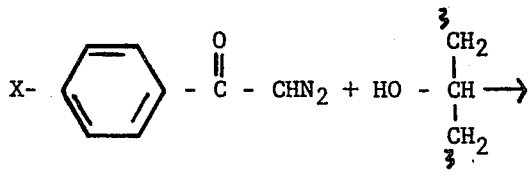

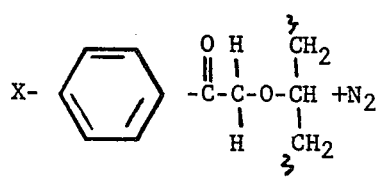

wherein X has one of the aforesaid meanings.

The reaction occurs in organic solvents at a temperature depending on the polymer solubility, generally ranging from 20° to 90°C, in the presence of a Lewis acid as a catalyst.

The inventive polymers, containing alpha-ketoether groups can be employed as such, or as additives adapted to render photodegradable the more usual polymers, when they are added thereto in any ratio. The addition can be carried out according to known techniques such as mixing, milling, etc.

This is an interesting feature of the present invention, and is a third aspect thereof, since, with respect to the systems which render polymers photodegradable through the addition of photosensitive substances, the inventive polymers show no migration.

The working formalities will be more clear by examining the following examples hereinafter reported for the sake of better illustrating the invention, without limiting the purposes thereof.

EXAMPLE 1

An ethylene-vinylacetate copolymer, wherein the quantity of acetate was 5% by weight, having a Melt flow index of 0.17 and a density of 0.9273, was hydrolyzed and the so obtained ethylenevinylalcohol (EVA) copolymer was grafted by p-chloroacetophenone diazoderivative.

The reaction was carried out in toluene at 65°C in the presence of BF$_3$.

The obtained polymer was added, at a 20 : 80 ratio, to a low density commercial polyethylene, "B/24/2, "(marketed by ANIC, S.p.A.) containing antioxidants and other usual ingredients.

The addition was carried out in a Baker-Perkins mixer heated to 160°C.

Films of 0.1 – 0.2 mm thickness were then obtained by melting the polymer in a Carver press heated to 170°C under a 3 kg/cm$^2$ pressure.

Such films were exposed to the radiations of a high pressure Xenon lamp which had a spectral energy similar to that of sun light.

During the exposure of the films the temperature was kept constant at 29°–32°C.

The degradation rate of the polymers was followed by the variations of the mechanical properties, particularly the percentage of elongation at break.

In the following table we report the elongation at break expressed as per cent of the starting value, as a function of the exposure time in hours.

| Samples | Elongation at break as per cent of the starting value at the following exposure hours | | | |
|---|---|---|---|---|
| | 60 | 120 | 180 | 300 |
| 1. EVA 5 % as such | 100 % | 100 % | 100 % | 93 % |
| 2. "B/24/2" as such | 100 % | 100 % | | 90 % |
| 3. "B/24/2" + EVA grafted 80 : 20 | 80 % | 25 % | 10 % | |

From the data reported in the table it is possible to appreciate the higher degradation rate of the polymer to which had been added grafted EVA.

EXAMPLE 2

To a high density commercial polyethylene (PEHD) containing small amounts of stabilizers and other usual ingredients was added EVA (5% vinyl acetate by weight) grafted with diazoacetophenone, in an amount equal to 25%.

Films of 0.1 – 0.2 mm thickness were obtained by melting the polymer in a Carver press heated to 200°C and exposed to the Xenon lamp according to example 1.

The degradation rate was followed by the variations of the mechanical properties, particularly the percentage of elongation at break.

In the following table the elongations at break are expressed as per cent of the starting value.

| Samples | Elongation at break as per cent of the starting value at the following exposure hours | | |
|---|---|---|---|
| | 60 | 120 | 180 | 300 |
| 1. PEHD as such | 100 % | 100 % | | 90 % |
| 2. PEHD + Additive | 60 % | 20 % | <10 % | |

EXAMPLE 3

To a commercial polypropylene was added, in the 80 : 20 ratio, EVA (5% vinyl acetate by weight), grafted by acetophenone diazoderivative. The grafting reaction was carried out according to the procedure of example 1.

Films were obtained and exposed to the radiations of a Xenon lamp according to example 2.

The degradation rate of the polymer was correlated to the time necessary for rendering it brittle.

| Sample | Time necessary for rendering brittle the polymer, in hours |
|---|---|
| 1. Polypropylene as such | > 120 |
| 2. Polypropylene + Additive | 30 |

What we claim is:

1. A process of rendering a copolymer of ethylene and vinyl alcohol degradable under the direct action of sunlight which consists in reacting said ethylene-vinyl alcohol copolymer with alpha-diazoacetophenone or para-chloro-alpha-diazoacetophenone in the presence of an organic solvent and a catalyst consisting of a Lewis acid in the temperature range of 20°–90°C.

2. The product produced by the process of claim 1.

3. A process of rendering degradable under the action of sunlight a polymer of ethylene or propylene which is adapted for use in packaging, which comprises blending with said polymer the product of claim 2.

4. Polymeric material adapted for use in packaging and degradable under the action of sunlight comprising a blend of a polymer of ethylene or propylene and the product of claim 2.

* * * * *

UNITED STATES PATENT AND TRADEMARK OFFICE
CERTIFICATE OF CORRECTION

PATENT NO. : 3,976,621
DATED : August 24, 1976
INVENTOR(S) : Nicola Palladino, et al It is certified that error appears in the above-identified patent and that said Letters Patent are hereby corrected as shown below:

First page, correct line "[73]" to read

-- [73]  Assignee:  Snamprogetti S.p.A.,

San Donato Milanese, Italy --.

Col. 2, line 26, before "acetate" insert -- vinyl --.

Signed and Sealed this

Twenty-fourth Day of May 1977

[SEAL]

Attest:

RUTH C. MASON
Attesting Officer

C. MARSHALL DANN
Commissioner of Patents and Trademarks